United States Patent
Copeland et al.

(10) Patent No.: US 9,831,724 B2
(45) Date of Patent: Nov. 28, 2017

(54) ACCESS CONTROL SYSTEM USING A WEARABLE ACCESS SENSORY IMPLEMENTING AN ENERGY HARVESTING TECHNIQUE

(71) Applicants: Richard L. Copeland, Lake Worth, FL (US); Melwyn F. Sequeira, Plantation, FL (US)

(72) Inventors: Richard L. Copeland, Lake Worth, FL (US); Melwyn F. Sequeira, Plantation, FL (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 252 days.

(21) Appl. No.: 14/956,803

(22) Filed: Dec. 2, 2015

(65) Prior Publication Data

US 2016/0156219 A1     Jun. 2, 2016

Related U.S. Application Data

(60) Provisional application No. 62/219,294, filed on Sep. 16, 2015, provisional application No. 62/086,241, filed on Dec. 2, 2014.

(51) Int. Cl.
G07C 9/00 (2006.01)
H02J 50/20 (2016.01)

(52) U.S. Cl.
CPC .......... *H02J 50/20* (2016.02); *G07C 9/00007* (2013.01)

(58) Field of Classification Search
CPC ............ G07C 9/00007; G07C 9/00031; G07C 9/00111; G07C 9/0019; H02J 50/20

(Continued)

(56) References Cited

U.S. PATENT DOCUMENTS 4,325,146 A   4/1982 Lennington
4,993,068 A   2/1991 Piosenka et al.
(Continued)

FOREIGN PATENT DOCUMENTS

CN   203825788   9/2014
EP   2495621   9/2012
(Continued)

OTHER PUBLICATIONS

Rais, N.H.M., et al., "A Review of Wearable Antenna," Antennas & Propagation Conference, 2009, LAPC 2009, Loughborough, Published IEEE; 978-1-4244-2720-8; DOI: 10.1109/LAPC.2009.5352373.

(Continued)

*Primary Examiner* — William Hernandez
(74) *Attorney, Agent, or Firm* — Fox Rothschild LLP; Robert J. Sacco; Carol E. Thorstad-Forsyth (57) ABSTRACT

A method for operating a Wearable Access Sensor ("WAS"). The methods comprise: capturing RF energy by the WAS, where the RF energy is emitted within a surrounding environment from equipment disposed at an access point of a restricted area; passing the RF energy through a switch that is normally in a position which provides an electrical connection between an antenna of the WAS and a full wave rectifier of the WAS; performing operations by the WAS to convert the RF energy into direct current for generating electric power; supplying the electric power to an energy storage device of the WAS for charging the energy storage device to a pre-determined voltage level; and supplying power from the energy storage device to a controller of the WAS when a voltage level of the energy storage device is equal to or greater than the pre-determined voltage level.

20 Claims, 8 Drawing Sheets

(58) Field of Classification Search
USPC .................................................. 307/52, 104
See application file for complete search history.

(56) References Cited

U.S. PATENT DOCUMENTS

| | | | |
|---|---|---|---|
| 5,365,266 A | 11/1994 | Carpenter | |
| 5,387,993 A | 2/1995 | Heller et al. | |
| 5,502,447 A | 3/1996 | Kumpfbeck et al. | |
| 5,532,705 A | 7/1996 | Hama | |
| 5,763,868 A | 6/1998 | Kubota et al. | |
| 5,947,369 A | 9/1999 | Frommer et al. | |
| 5,960,085 A | 9/1999 | de la Huerga | |
| 5,966,227 A | 10/1999 | Dubois et al. | |
| 5,988,645 A | 11/1999 | Downing | |
| 6,219,439 B1 | 4/2001 | Burger | |
| 6,288,644 B1 | 9/2001 | Mathews et al. | |
| 6,339,999 B1 | 1/2002 | Newell | |
| 6,346,886 B1 | 2/2002 | De La Huerga | |
| 6,788,262 B1 | 9/2004 | Adams et al. | |
| 6,888,502 B2 | 5/2005 | Beigel et al. | |
| 6,950,098 B2 | 9/2005 | Brabander et al. | |
| 7,119,688 B2 | 10/2006 | Wildman | |
| 7,202,789 B1* | 4/2007 | Stilp | G05B 9/03 340/568.2 |
| 7,424,316 B1 | 9/2008 | Boyle | |
| 7,450,024 B2 | 11/2008 | Wildman et al. | |
| 7,450,077 B2 | 11/2008 | Waterhouse et al. | |
| 7,629,934 B2 | 12/2009 | Rhodes et al. | |
| 7,696,882 B1 | 4/2010 | Rahimi et al. | |
| 7,849,619 B2 | 12/2010 | Mosher, Jr. et al. | |
| 7,898,385 B2 | 3/2011 | Kocher | |
| 7,982,616 B2 | 7/2011 | Banerjee et al. | |
| 7,983,565 B2 | 7/2011 | Varshneya et al. | |
| 8,267,325 B2 | 9/2012 | Phaneuf | |
| 8,447,188 B2 | 5/2013 | Scott et al. | |
| 8,497,808 B2 | 7/2013 | Wang | |
| 8,502,681 B2 | 8/2013 | Bolling et al. | |
| 8,599,101 B2 | 12/2013 | Christie et al. | |
| 8,646,695 B2 | 2/2014 | Worrall et al. | |
| 8,674,810 B2 | 3/2014 | Uysal et al. | |
| 8,917,214 B2 | 12/2014 | Forster | |
| 8,985,439 B2 | 3/2015 | Braun | |
| 9,076,273 B2 | 7/2015 | Smith et al. | |
| 9,384,608 B2 | 7/2016 | Strulovitch et al. | |
| 9,514,584 B1 | 12/2016 | Burge et al. | |
| 9,519,853 B2 | 12/2016 | Tolle | |
| 9,600,999 B2 | 3/2017 | Stenzler | |
| 2002/0084904 A1 | 7/2002 | De La Huerga | |
| 2002/0140558 A1 | 10/2002 | Lian et al. | |
| 2003/0005193 A1 | 1/2003 | Seroussi et al. | |
| 2004/0085208 A1 | 5/2004 | Fukuoka | |
| 2004/0246103 A1 | 12/2004 | Zukowski | |
| 2005/0168340 A1 | 8/2005 | Mosher et al. | |
| 2005/0285740 A1 | 12/2005 | Kubach et al. | |
| 2006/0022816 A1 | 2/2006 | Yukawa | |
| 2006/0219778 A1 | 10/2006 | Komatsu | |
| 2007/0182559 A1 | 8/2007 | Lawrence et al. | |
| 2008/0055045 A1 | 3/2008 | Swan et al. | |
| 2008/0074652 A1 | 3/2008 | Fouquet et al. | |
| 2009/0121931 A1 | 5/2009 | Katz | |
| 2009/0322513 A1 | 12/2009 | Hwang et al. | |
| 2010/0315244 A1 | 12/2010 | Tokhtuev et al. | |
| 2010/0328043 A1 | 12/2010 | Jantunen et al. | |
| 2011/0022121 A1 | 1/2011 | Meskins | |
| 2011/0148602 A1 | 6/2011 | Goh et al. | |
| 2011/0206378 A1 | 8/2011 | Bolling et al. | |
| 2011/0316700 A1 | 12/2011 | Kasahara et al. | |
| 2012/0056719 A1 | 3/2012 | Krishna et al. | |
| 2012/0189312 A1 | 7/2012 | Maryfield et al. | |
| 2012/0234921 A1 | 9/2012 | Tiedmann et al. | |
| 2012/0242481 A1* | 9/2012 | Gernandt | G06K 19/0705 340/539.13 |
| 2012/0242501 A1 | 9/2012 | Tran et al. | |
| 2012/0256492 A1 | 10/2012 | Song et al. | |
| 2012/0286927 A1 | 11/2012 | Hagl | |
| 2013/0010962 A1 | 1/2013 | Buer et al. | |
| 2013/0027180 A1 | 1/2013 | Lakamraju et al. | |
| 2013/0221938 A1 | 8/2013 | Conte et al. | |
| 2014/0068742 A1* | 3/2014 | Phillips | G06Q 20/327 726/7 |
| 2014/0077929 A1 | 3/2014 | Dumas et al. | |
| 2014/0159959 A1 | 6/2014 | Rhoads et al. | |
| 2014/0159975 A1 | 6/2014 | Apostolos et al. | |
| 2014/0226844 A1 | 8/2014 | Kerselaers | |
| 2014/0240087 A1 | 8/2014 | Liu et al. | |
| 2014/0240088 A1* | 8/2014 | Robinette | G08B 13/1427 340/5.61 |
| 2014/0327517 A1 | 11/2014 | Portet | |
| 2014/0354494 A1 | 12/2014 | Katz | |
| 2014/0375429 A1 | 12/2014 | Cristache | |
| 2015/0022321 A1 | 1/2015 | Lefevre | |
| 2015/0041614 A1 | 2/2015 | Tran et al. | |
| 2015/0054696 A1 | 2/2015 | Werner et al. | |
| 2015/0070134 A1 | 3/2015 | Nagisetty et al. | |
| 2015/0078741 A1 | 3/2015 | O'Connor et al. | |
| 2015/0149310 A1 | 5/2015 | He et al. | |
| 2015/0154486 A1 | 6/2015 | McFarthing et al. | |
| 2015/0168554 A1 | 6/2015 | Aharoni et al. | |
| 2015/0180716 A1 | 6/2015 | Aminzade | |
| 2015/0185160 A1 | 7/2015 | Lacoste et al. | |
| 2015/0188632 A1 | 7/2015 | Aoyama et al. | |
| 2015/0221147 A1 | 8/2015 | Daniel-Wayman et al. | |
| 2015/0250419 A1 | 9/2015 | Cooper et al. | |
| 2015/0264431 A1 | 9/2015 | Cheng | |
| 2015/0280829 A1 | 10/2015 | Breuer et al. | |
| 2015/0339870 A1 | 11/2015 | Cojocaru et al. | |
| 2015/0341114 A1 | 11/2015 | Pederson | |
| 2015/0365166 A1 | 12/2015 | Deyle et al. | |
| 2015/0379791 A1 | 12/2015 | Russell et al. | |
| 2016/0007315 A1 | 1/2016 | Lundgreen et al. | |
| 2016/0014103 A1 | 1/2016 | Masters et al. | |
| 2016/0055692 A1 | 2/2016 | Trani | |
| 2016/0095189 A1 | 3/2016 | Vangeel et al. | |
| 2016/0164607 A1 | 6/2016 | Pederson | |
| 2016/0267760 A1 | 9/2016 | Trani | |
| 2016/0284183 A1 | 9/2016 | Trani | |
| 2016/0294835 A1 | 10/2016 | Beaumont et al. | |
| 2016/0343187 A1 | 11/2016 | Trani | |
| 2016/0344091 A1 | 11/2016 | Trani | |
| 2017/0026118 A1 | 1/2017 | Pederson | |
| 2017/0228953 A1* | 8/2017 | Lupovici | G07C 9/00309 |

FOREIGN PATENT DOCUMENTS

| | | |
|---|---|---|
| WO | 1999041721 A1 | 8/1999 |
| WO | 2014/113882 A1 | 7/2014 |
| WO | 2014/210000 | 12/2014 |
| WO | 2015/023737 A1 | 2/2015 |

OTHER PUBLICATIONS

Hall, P.S., et al., "Antennas and Propagation for Body Centric Communications," Proc. 'EUCAP 2006', Nice, France, Nov. 6-10, 2006 (ESA SP-626, Oct. 2006).

Conway, G.A., et al., "Antennas for Over-Body-Surface Communication at 2.45 GHz," IEEE Transactions on Antennas and Propagation, vol. 57, No. 4, Apr. 2009, 0018-926X, copyright 2009 IEEE.

Ito, K., et al., "Wearable Antennas for Body-Centric Wireless Communications," copyright IEEE 2010; 978-1-4244-6418-0/10.

Matthews, J.C.G., et al., "Body Wearable Antennas for UHF/VHF," 2008 Loughborough Antennas & Propagation Conference, 978-1-4244-1894-7/08, copyright 2008 IEEE.

* cited by examiner

ACCESS CONTROL SYSTEM USING A WEARABLE ACCESS SENSORY IMPLEMENTING AN ENERGY HARVESTING TECHNIQUE

CROSS-REFERENCE TO RELATED APPLICATIONS

This application claims priority benefits of U.S. Provisional Patent Application No. 62/086,241 filed on Dec. 2, 2014 and U.S. Provisional Patent Application No. 62/219, 294 filed on Sep. 16, 2015. The contents of the listed documents are herein incorporated by reference.

FIELD OF THE INVENTION

This document relates generally to Access Control Systems ("ACSs") for restricted areas. More particularly, this document relates to ACSs using a wearable access sensor implementing an energy harvesting technique.

BACKGROUND OF THE INVENTION

There are many ACSs known in the art. One such ACS comprises a plurality of Access Control Readers ("ACRs") mounted at exits and/or entries of restricted areas. For example, an ACR may be disposed adjacent to a doorway through which access to a restricted room is gained. A badge worn by a person is used to gain access to a restricted room via the ACR. In this regard, the badge comprises a Low Frequency ("LF") passive Radio Frequency Identifier ("RFID") communication device disposed thereon or therein. The LF passive RFID communication device typically operates at a frequency of 125 kHz. The ACR is a near field device with a detection range of about 5 cm or less. Throughout a given time period, the ACS tracks which entries a given person passes through for purposes of entering a restricted area. However, the ACS does not track when the person leaves each visited restricted area within the given time period.

Another conventional ACS employs beacons and wireless communication devices (e.g., mobile phones) which communicate via Bluetooth technology. A personal identifier is stored on the wireless communication device, and communicated to the beacon when the person is in proximity thereto. In response to the reception of the personal identifier, the ACS would allow the person to have access to the restricted area.

SUMMARY OF THE INVENTION

The present disclosure concerns systems and methods for operating a Wearable Access Sensor ("WAS"). The methods comprise capturing RF energy by the WAS being worn by a person. The RF energy is emitted within a surrounding environment from equipment disposed at an access point of a restricted area. The RF energy is passed through a switch that is normally in a position which provides an electrical connection between an antenna of the WAS and a full wave rectifier of the WAS. The WAS then performs operations to convert the RF energy into direct current for generating electric power. The electric power is supplied to an energy storage device (e.g., a super capacitor) of the WAS for charging the energy storage device to a pre-determined voltage level. Power is supplied from the energy storage device to a controller of the WAS when a voltage level of the energy storage device is equal to or greater than the pre-determined voltage level.

In some scenarios, the methods also comprise: generating and sending a switch control signal from the controller to the switch to cause the switch to change positions such that the switch is disconnected from the antenna and connected to a transceiver of the WAS; and communicating information from the WAS to a wireless edge device. The information comprises user credentials that are useful for authenticating a user such that the user can be granted or denied access to the restricted area.

In those or other scenarios, the power is supplied from the energy storage device to the controller via a voltage converter. The voltage converter changes the pre-determined voltage level to a sub-threshold voltage level. More particularly, the voltage converter increases or decreases a voltage level of a signal received from the energy storage device to a sub-threshold voltage level. The sub-threshold voltage level is at least one order of magnitude below a normal operating range for the WAS. The voltage level change is performed prior to supplying the power from the energy storage device to the controller. The normal operating range of a voltage level may be within 1.2 Volts to 3.6 Volts. The sub-threshold voltage level may be within 200 milli-Volts to 600 milli-Volts.

In those or yet other scenarios, a directionality of the WAS's movement is determined based on at least one of a rate of change of a charging voltage of the energy storage device and a detected direction of travel of the WAS in relation to the access point.

DESCRIPTION OF THE DRAWINGS

Embodiments will be described with reference to the following drawing figures, in which like numerals represent like items throughout the figures, and in which.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present invention may be implemented on one or any combination of hardware, firmware and software. The present invention may also be implemented as instructions contained in or on a machine-readable medium, which may be read and executed by one or more processors to enable performance of the operations described herein. A machine-readable medium may include any mechanism for storing, transmitting and/or receiving information in a form readable by a machine (e.g., a computer). For example, a machine-readable medium may include a tangible storage medium, such as but not limited to, Read Only Memory ("ROM"), Random Access Memory ("RAM") and/or a flash memory device. A machine-readable medium may also include a propagated signal which has been modulated to encode the instructions, such as but not limited to electromagnetic, optical or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some scenarios they might not.

The present disclosure provides a novel ACS implementing a method for controlling access to restricted areas. An exemplary architecture 100 for the novel ACS is provided in FIG. 1. An object of ACS 100 is to use a wearable device that can harvest just enough Radio Frequency ("RF") energy emanating from a wireless edge device (e.g., a device mounted at an entryway), supply the harvested power to an on-board wireless transceiver and controller so as to enable wireless authentication and access through an entry way.

Accordingly, ACS 100 is generally configured to manage the entrance and exit of people through at least one secure area 118. In this regard, each secure area is entered and exited via an access point, such as a doorway 102. Exit and entrance antennas 106, 108 are disposed on front and back surfaces of the same structural wall or different structural walls located adjacent to the access point 102. For example, the entrance antenna 108 is disposed on a front sidewall surface 130 of a structural wall 132 located adjacent to the doorway 102. In contrast, the exit antenna 106 is disposed on a back sidewall surface (not shown in FIG. 1) of a structural wall 134 located adjacent to the doorway 102. The antennas 106, 108 are also communicatively coupled to a reader 104. The reader 104 is communicatively coupled to a Data Processing System ("DPS") 112 via a network (e.g., an Intranet and/or an Internet).

Figure 1:
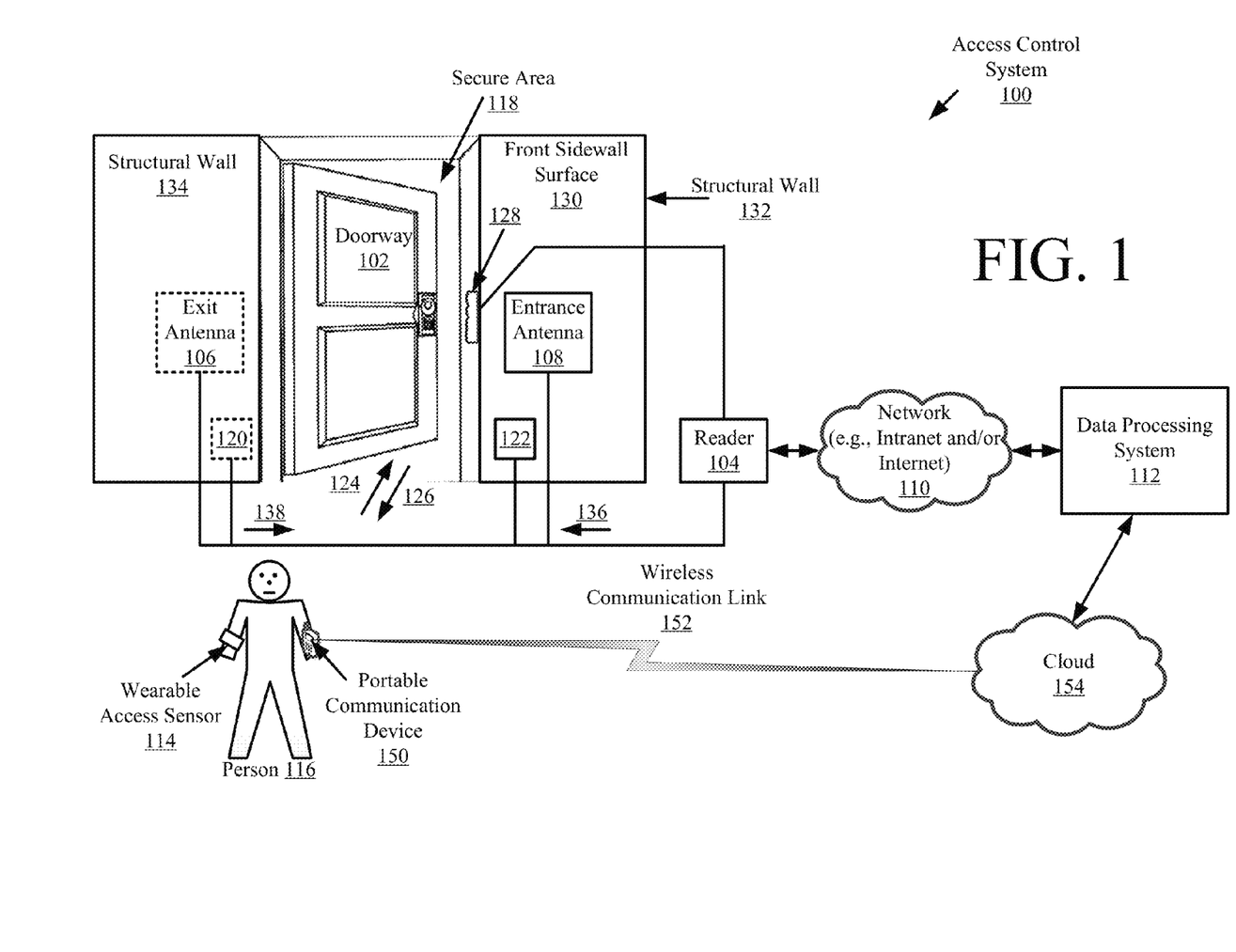
FIG. 1 is a perspective view of an exemplary ACS.

A WAS 114 is assigned to each individual authorized for accessing restricted areas of a business entity. The WAS 114 comprises a wearable communications device that can be worn by the person 116 to which it is assigned. As shown in FIG. 1, WAS 114 comprises a wrist band with internal sensor circuitry (not shown in FIG. 1). The present invention is not limited in this regard. WAS 114 can include any other type of wearable item, such as a watch, necklace, hat, headset or clip-on item which can be worn on a person or on a person's clothing at a location offset from the person's center axis. In all scenarios, the WAS 114 facilitates the entrance and exit of the authorized person through the secure area 118. A schematic illustration of an exemplary architecture for the WAS 114 is provided FIG. 2, which will be described below.

In some scenarios, the WAS 114 runs at a sub-threshold power or voltage level. The term "sub-threshold", as used herein, means that a power level and/or voltage level falls at least one order of magnitude below a normal operating range for a given device. For example, traditional processing systems normally operate at a power level of approximately 3 milli-Watts and/or a voltage level within 1.2 Volts to 3.6 Volts. In contrast, the WAS 114 runs at a sub-threshold power level at approximately 3 micro-Watts and/or a voltage level within 200 milli-Volts to 600 milli-Volts.

For example, the WAS 114 may include a diode junction (or rectifier) to rectify an incoming signal and a transistor to switch the incoming signal to/from a transceiver. In conventional RFID devices, the input voltage needed to operate the diode junction and transistor is of a threshold voltage level (e.g., 1.5-3.0 Volts, 0.7 Volts for the diode junction and 0.6 Volts for the transistor). In contrast, the input voltage needed to operate the diode junction and transistor of the WAS 114 is of a sub-threshold voltage level (e.g., 0.6 Volts) which is lower than the threshold voltage level (e.g., 1.5-3.0 Volts) of conventional RFID devices. For example, in the present solution, 0.3-0.4 Volts may be supplied to the diode bridge and 0.2-0.3 Volts may be supplied to the transistor. In effect, the operating voltage required to operate the WAS 114 is substantially reduced (e.g., from 1.5-3.0 Volts to 0.2-0.6 Volts) as compared to that of conventional RFID devices. In some scenarios, the diode bridge employed by the present solution comprise low drop out diodes which enable active rectification at less than 20 milli-Volts compared to conventional diodes which enable rectification at 300-700 milli-Volts.

Figure 2:
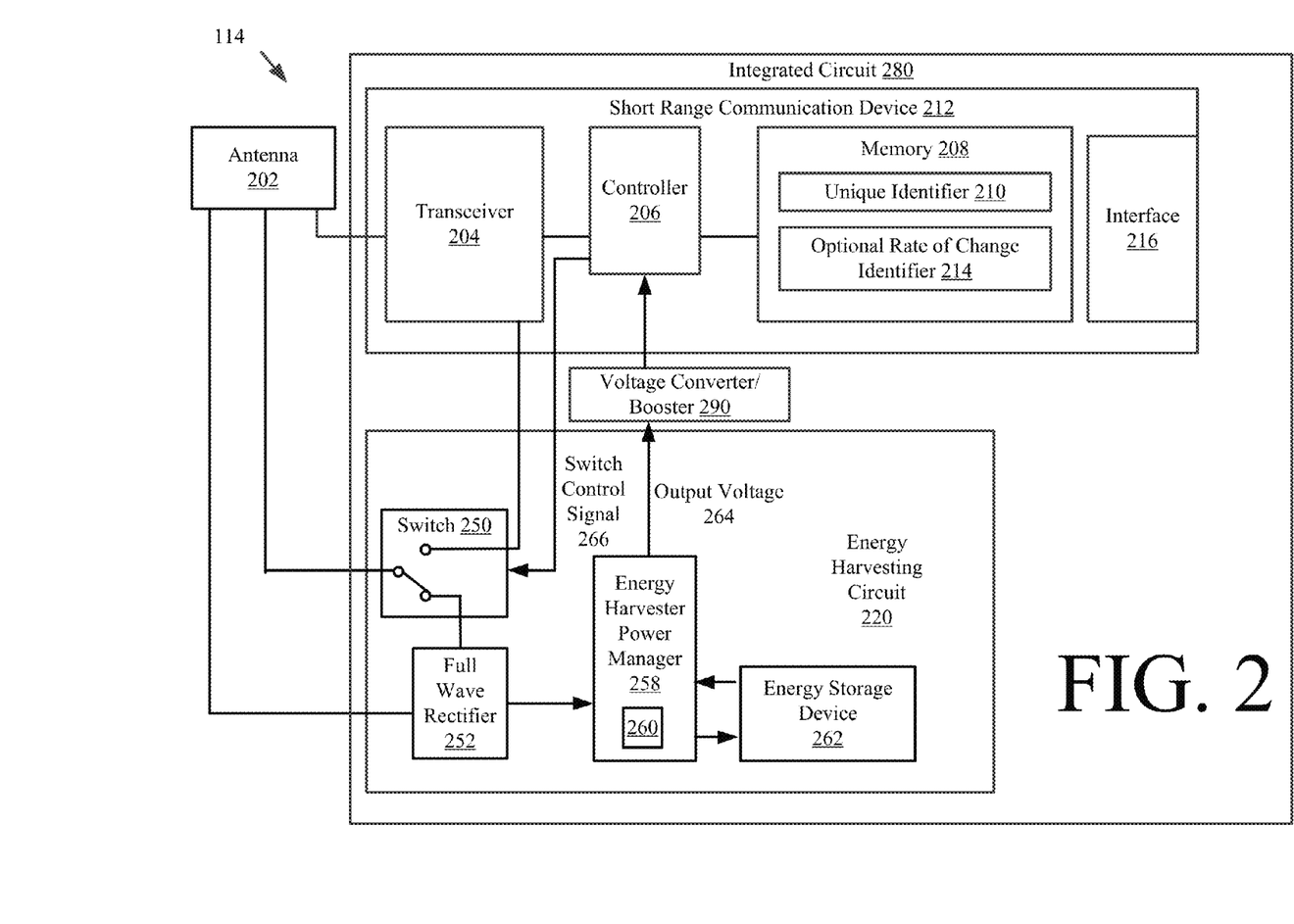
FIG. 2 is a block diagram of an exemplary architecture for the WAS shown in FIG. 1.

In this regard, the WAS 114 comprises an energy harvesting circuit 220 and a voltage converter 290, as shown in FIG.

2. The energy harvesting circuit 220 is provided for deriving energy from an external source to power other electronic components 204, 206, 208, 216 internal to the WAS 114. The energy harvesting circuit 220 is generally configured to collect received energy from RF fields. The energy harvesting circuit 220 is sized and shaped to minimize the amount of space taken up thereby on the WAS 114 having a height≤approximately 2 inches and a width≤approximately 3 inches. For example, the energy harvesting circuit 220 can include, but is not limited to, a device having a part number BQ25570 which is available from Texas Instruments of Dallas, Tex. Additionally or alternatively, the energy harvesting circuit 220 can include, but is not limited to, that shown in FIG. 2 and discussed below.

The voltage converter 290 comprises an electric power converter which changes the output voltage of an electrical power source, such as the energy harvesting circuit 220. The voltage converter 290 includes, but is not limited to, an inverter, a semiconductor switch (e.g., a transistor), passive components (e.g., inductors, capacitors, resistors, and/or diodes), and/or a transformer to change the voltage of AC power. In all scenarios, the voltage converter 290 raises or lowers the level of an input voltage received from the energy harvesting circuit 220 to the sub-threshold voltage level (e.g., 0.6 Volts).

Reducing the required operating voltage of the WAS 114 means a lower field level (volts per meter) is required for a given antenna size. In addition, running the WAS 114 at a sub-threshold power or voltage level means an Integrated Circuit ("IC") 280 of the WAS 114 operates more slowly than normal super-threshold ICs, but runs at 100-1000 times lower current. Furthermore, operating the WAS 114 at sub-threshold levels allows the output antenna power of the antennas 106, 108 to be significantly lowered as compared to conventional non sub-threshold based RFID systems.

The IC 280 of the WAS 114 can implement components 212, 220 and 290. The IC 280 can be created by (1) changing the processing parameters for the mask set during fabrication, (2) changing the implantation rules for dopants and/or (3) changing processing parameters. However, the IC can be made on regular CMOS fabrication lines without affecting the normal operating of the line. This allows most FAB lines to create sub-threshold electronics on their standard lines using the normal mask processes used in fabrication.

Normally, running the IC 280 at half the voltage would cut the current by half as well as result in an IC operating at one quarter of the power. However, in this situation, the required power is reduced by 25-250 times more because of lower circuit losses and a slower operating speed. This lower power allows the very low input voltages into a voltage booster 290 to supply sufficient power to operate the IC.

The advantages of running the IC 280 at a sub-threshold power or voltage level are substantial. For example, the IC 280 is ideally suited to working with energy harvesting devices which are notorious for supplying very low power and voltages. Just as important is the IC's 280 use with resulting inlays or RFID devices. Since the operating power of the IC 280 is substantially reduced, the read range for a given sized inlay is ten to fifteen times larger as compared to that of conventional RFID devices. For example, an inlay that is only one centimeter long can operate like a conventional inlay that is ten to fifteen centimeters long. Notably, the size of the antenna 202 can be reduced as compared to that of conventional RFID devices, while still maintaining the larger read range. The size reduction of the inlay and antenna provide significant advantages when placing the IC 280 in/on packaging or incorporating the IC 280 into a wearable item.

Referring again to FIG. 2, the energy harvesting circuit 220 comprises a switch 250, a full wave rectifier 252, an energy harvester power manager 258 and an energy storage device 262. In some scenarios, the energy harvesting circuit 220 may also comprise matching circuits (not shown) to optimize a power transfer from an antenna 202 of the WAS 114 and/or to impedance match the antenna to a transceiver 204 of the WAS 114. Antenna 202 can include any known or to be known antenna. For example, in some scenarios, the antenna comprises an antenna described in U.S. Patent Publication No. 2015/0054696. The present invention is not limited in this regard.

In some scenarios, the energy storage device 262 comprises a super capacitor. The switch 250 includes a Field Effect Transistor ("FET") switch. The FET switch may comprise a Heterostructure FET ("HFET") which without applied power directly couples the antenna 202 to the energy harvesting electronics. The present invention is not limited to the particulars of these scenarios.

During operation, RF energy is emitted within a surrounding environment from equipment disposed at an access point of a restricted area. Upon entering into the RF field which corresponds to the antenna operating frequency, the energy harvesting circuit 220 charges up the energy storage device 262 (e.g., a super capacitor) to a pre-determined voltage level. In this regard, it should be understood that the switch 250 is normally in a position which provides an electrical connection or closed circuit between the antenna 202 and the full wave rectifier 252, as shown in FIG. 2. In the absence of an energy source (and hence the application of a voltage to power the switch), the switch 250 is in an indeterminate state causing the RF signal to bleed through both channels thereof, but with significantly reduced output. However, the voltage output is sufficient to turn on or enable the energy harvesting electronics 252, 258, 262 such that RF energy can be captured thereby.

Figure 6:
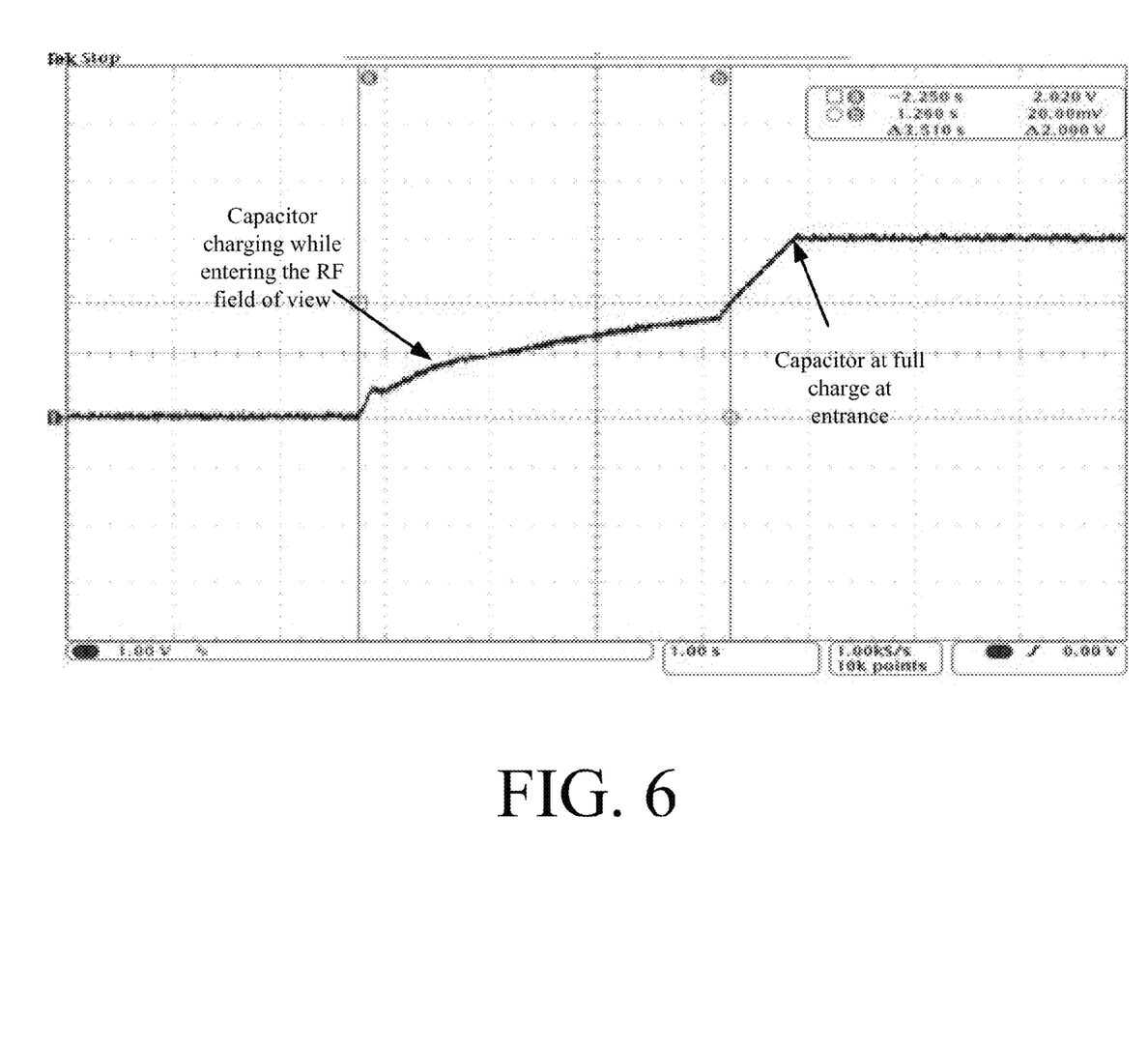
FIG. 6 provides a graph showing charging of a capacitor.

The captured RF energy is passed through the switch 250 by virtue of the switches characteristics described above. The energy harvester power manager 258 converts the received RF energy into direct current for generating electric power. The electric power is supplied to the energy storage device 262 (e.g., a super capacitor) for charging the same to the pre-determined voltage level. A graph is provided in FIG. 6 that is useful for understanding the charging of an energy storage device, such as a capacitor. The voltage on the energy storage device 262 is sufficient to power up the components 204, 206 of the Short Range Communication ("SRC") device 212 as the user of the WAS 114 passes through the RF field generated by the wireless edge device located at the entryway.

When the energy storage device 262 is charged to the pre-determined voltage level, power is supplied from the energy storage device 262 to the controller 206 via the energy harvester power manager 258. The controller 206 generates and sends a switch control signal 266 to the switch 250. The switch control signal 266 includes a command to cause the switch 250 to change positions. In effect, the switch 250 is disconnected from the energy harvesting circuit 220, whereby an open circuit is formed between the antenna 202 and the full wave rectifier 252. The switch 250 is connected to the transceiver 204 so as to allow communication of information from the WAS 114 to a nearby communications device. Next, the controller 206 initiates communications with the wireless edge device such that user credentials are passed from the WAS 114 to the wireless edge device. The wireless edge device processes the user credentials for authenticating the user. If the user is not authenticated, then (s)he is denied access to the restricted area. In contrast, if the user is authenticated, then (s)he is granted access to the restricted area.

Referring again to FIG. 2, the antenna 202 of WAS 114 may comprise a directional antenna arranged to point away from the person's body when the WAS 114 is being worn thereby. The antenna 202 is coupled to the SRC device 212 implementing SRC technology. The SRC technology includes, but is not limited to, RFID technology which uses radio-frequency electromagnetic fields to identify persons and/or objects when they come close to the reader 104. Accordingly, the SRC device 212 facilitates communication of a unique identifier 210 to the reader 104 via SRC reply signals in response to interrogation signals sent from reader 104. The unique identifier 210 is then used by the reader 104 and/or DPS 112 to automatically identify the person 116 which is in proximity to the access point 102 and/or whether the person is authorized to access the restricted area.

At the access point 102, the reader 104 determines the directionality of the WAS 114 emitting the SRC reply signal. This determination is made based on RSSI measurements of the power present in the SRC reply signal received by an antenna 106 or 108 from the WAS 114. The RSSI measurements specify the signal strength of the SRC reply signal received at antenna 106 or antenna 108, and whether the signal strength is increasing or decreasing during a given period of time. If the signal strength of the SRC reply signal is increasing during the given period of time, then the WAS 114 is deemed to be traveling towards to the respective antenna 106 or 108. In contrast, if the signal strength of the SRC reply signal is decreasing during the given period of time, then the WAS 114 is deemed to be traveling away from the respective antenna 106 or 108.

However, such determinations are not sufficient to detect whether the person is attempting to enter or exit the restricted area. Accordingly, additional motion sensors 120, 122 are employed herein. The motion sensors may be provided at the access point 102. A first motion sensor 122 is disposed on the front sidewall surface 130 of the structural wall 132 located adjacent to the access point 102. In contrast, a second motion sensor 122 is disposed on a back sidewall surface (not shown in FIG. 1) of the structural wall 134 located adjacent to the access point 102. The motion sensors 120, 122 are used to determine the direction and/or speed/velocity of travel of the person 116 in proximity to the access point 102. Information specifying the person's direction and/or speed/velocity of travel is provided from the motion sensors 120, 122 to the reader 104.

Notably, the present invention is not limited to the motion sensor configuration shown in FIG. 1. Additionally or alternatively, the motion sensors provided in wireless communication devices (e.g., mobile phones or smart phones) can be used to detect the direction and/or velocity of the person's motion.

In turn, the reader 104 forwards the information received from the motion sensor(s) 120, 122 to the DPS 112 via network 110. Similarly, reader 104 communicates information to the DPS 112 indicating the directionality of the WAS 114 (i.e., whether the WAS 114 is traveling towards or away from the antenna 106 or 108). The DPS 112 may be located in the same facility as the reader 104 or in a different facility remote from the facility in which the reader 104 is disposed. As such, the network 110 may comprise an Intranet and/or the Internet. Additionally, each exit and/or entrance to a restricted area in each facility of a business entity may have access control sensory systems 104-108, 120, 122 disposed thereat so as to define a distributed network of access control sensor systems.

At the DPS 112, the information is used to determine whether or not the person is attempting to enter or exit the access point 102. For example, if the information indicates that the WAS 114 is traveling towards the entrance antenna 108 and the person is moving in direction 124, then a determination is made that the person desires to enter the restricted area via access point 102. In contrast, if the information indicates that the WAS 114 is traveling towards antenna 106 and the person is moving in direction 126, then a determination is made that the person desires to exit the restricted area via the access point 102. If the information indicates that the WAS 114 is traveling away from the antenna 108, then a determination is made that the person is not trying to enter the restricted area. Similarly, if the information indicates that the WAS 114 is traveling away from the antenna 106, then a determination is made that the person is not trying to exit the restricted area.

The DPS 112 may also analyze patterns of motion defined by the information to determine whether or not the person desires to enter or exit the access point 102. For example, if the information indicates that the person 116 is traveling in a direction 124, 136 or 138 towards the access point 102 during a first period of time and then travels in a direction 126, 136 or 138 away from the access point 102 during an immediately following second period of time, then a determination is made that the person does not want to gain access to the restricted area, but is simply passing by the access point. In contrast, if the information indicates that the person 116 is traveling at a first speed in a direction 124, 136 or 138 towards the access point 102 during a first period of time and then slows down as (s)he approaches the access point, a determination is made that the person does want to gain access to the restricted area. Similarly, if the information indicates that the person 116 is traveling at a first speed in a direction 124, 136 or 138 towards the access point 102 during a first period of time and stops upon reaching the access point, a determination is made that the person does want to gain access to the restricted area.

Upon determining that the person does not want to enter or exit the restricted area, the DPS 112 simply logs the unique identifier, the directionality information, the motion direction information, the speed/velocity information, and/or the results of the information analysis in a data store (not shown in FIG. 1) for later use. Upon determining that the person does want to enter the restricted area, the DPS 112 compares the unique identifier 210 to a plurality of unique identifiers stored in the data store to check whether the person is authorized to enter the restricted area. If the person is authorized to enter the restricted area, the DPS 112 causes a door opening actuator 128 to be actuated (e.g., for unlocking a lock). The DPS 112 also logs results of the information analysis and/or information specifying that access to the restricted area was provided to the person at a particular time. Upon determining that the person wants to exit the restricted area, the DPS 112 causes a door opening actuator 128 to be actuated, and also logs results of the information analysis and/or information specifying that the person exited the restricted area at a particular time.

The data logging allows the DPS 112 to track the access points through which the person enters and exits, and the time of such entering and exiting. This historical information is useful for a variety of reasons. For example, the historical information can be used to determine when employees arrive at and/or leave work, whereby the need for conventional employee time-attendance systems requiring each employee to manually clock-in upon arrival at work and clock-out upon leaving work is no longer necessary. The historical information can also be used to identify individuals who gained access to a restricted area when a possible theft occurred or when equipment was removed from the restricted area.

Notably, the above described access control system overcomes certain drawbacks of conventional access control systems. For example, in the present invention, authorized individuals do not need to take any manual actions (e.g., swiping a card) to gain access to restricted areas. In effect, the need for certain access control equipment (e.g., card readers) has been eliminated, thereby reducing the overall cost of implementing the present access control system 100.

In other scenarios, the WAS 114 operates in both an energy harvesting mode and a communications mode. In the energy harvesting mode, the energy harvesting circuit 220 collects energy every time WAS 114 passes by an access point. The collected energy is stored in the energy storage device 222 (e.g., a capacitor). Once the energy storage device 222 is charged to an operating voltage level of the SRC device 212, the mode of the WAS 114 is changed from the energy harvesting mode to the communications mode. Thereafter, an SRC identifier signal is sent to the reader 104 via antenna 202 at the access point 102. The SRC identifier signal comprises the unique identifier 210. Information 214 indicating the rate of change of the charging voltage of the energy storage device 222 (e.g., a capacitor) may also be sent from the WAS 114 to the reader 104 via the SRC identifier signal. The rate of change information 214 specifies directionality of the WAS 114. At a later time, the reader 104 communicates the unique identifier 210 and/or rate of change information 214 to the DPS 112.

Notably, the motion sensors 120, 122 are also employed along with the multi-mode WAS 114 (i.e., the WAS configured to operate in both an energy harvesting mode and a communications mode). The motion sensors 120, 122 are used to determine the direction and/or speed/velocity of travel of the person 116 in proximity to the access point 102. Information specifying the person's direction and/or speed/velocity of travel is provided from the motion sensors 120, 122 to the reader 104.

At the DPS 112, a determination is made as to whether the person is authorized to access the restricted area based on the unique identifier 210 and/or whether the person is attempting to enter or exit the restricted area based on the rate of change information 214. If the person is attempting to enter the restricted area and is not authorized to access the restricted area, then the DPS 112 simply logs information indicating that the person was in proximity of the access point at a particular time. In contrast, if the person is attempting to enter the restricted area and is authorized to access the restricted area, then the DPS 112 causes the door opening actuator 128 to be actuated. The DPS 112 also logs information specifying that access to the restricted area was provided to the person at a particular time.

In this scenario, the reader 104 is simply an edge connect module that controls the door opening actuator. As a result, the need for an interrogation reader (e.g., an RFID reader) is eliminated, thereby reducing the overall cost required to implement system 100.

Figure 3A:
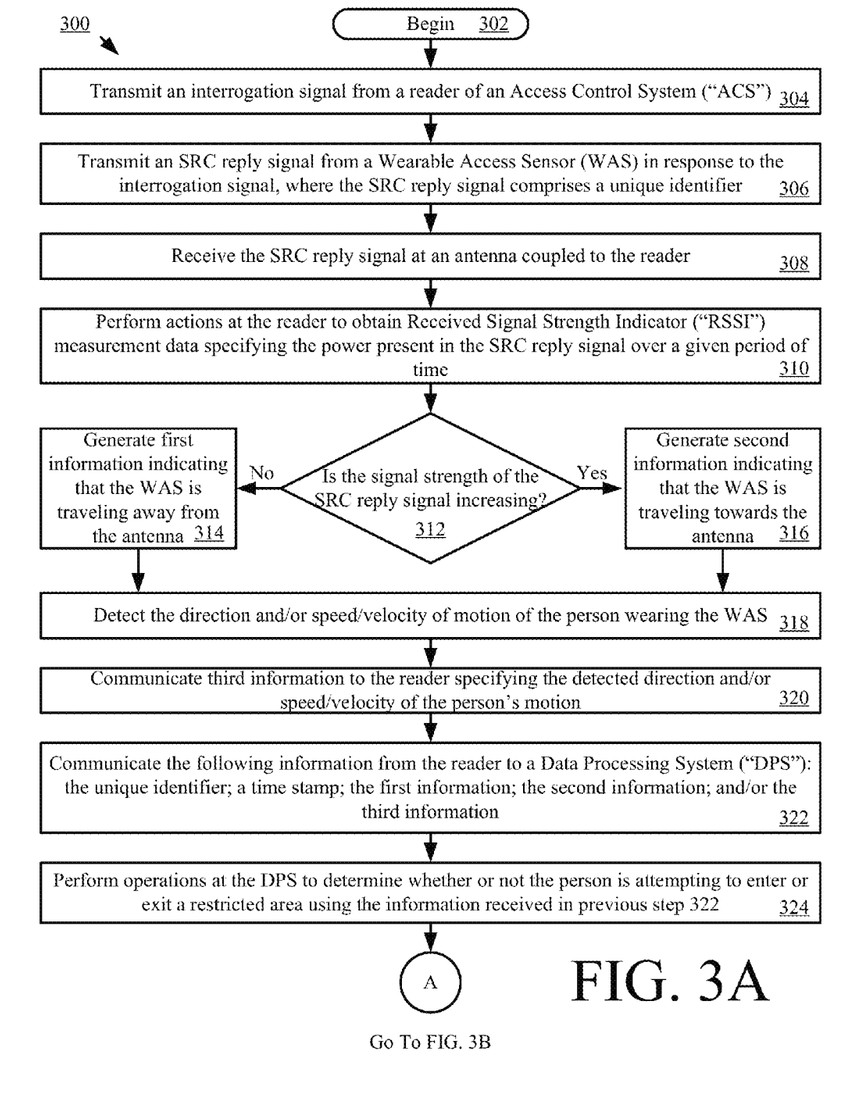
FIGS. 3A-3B collectively provide a flow diagram of an exemplary method for controlling access to a restricted area.
Figure 3B:
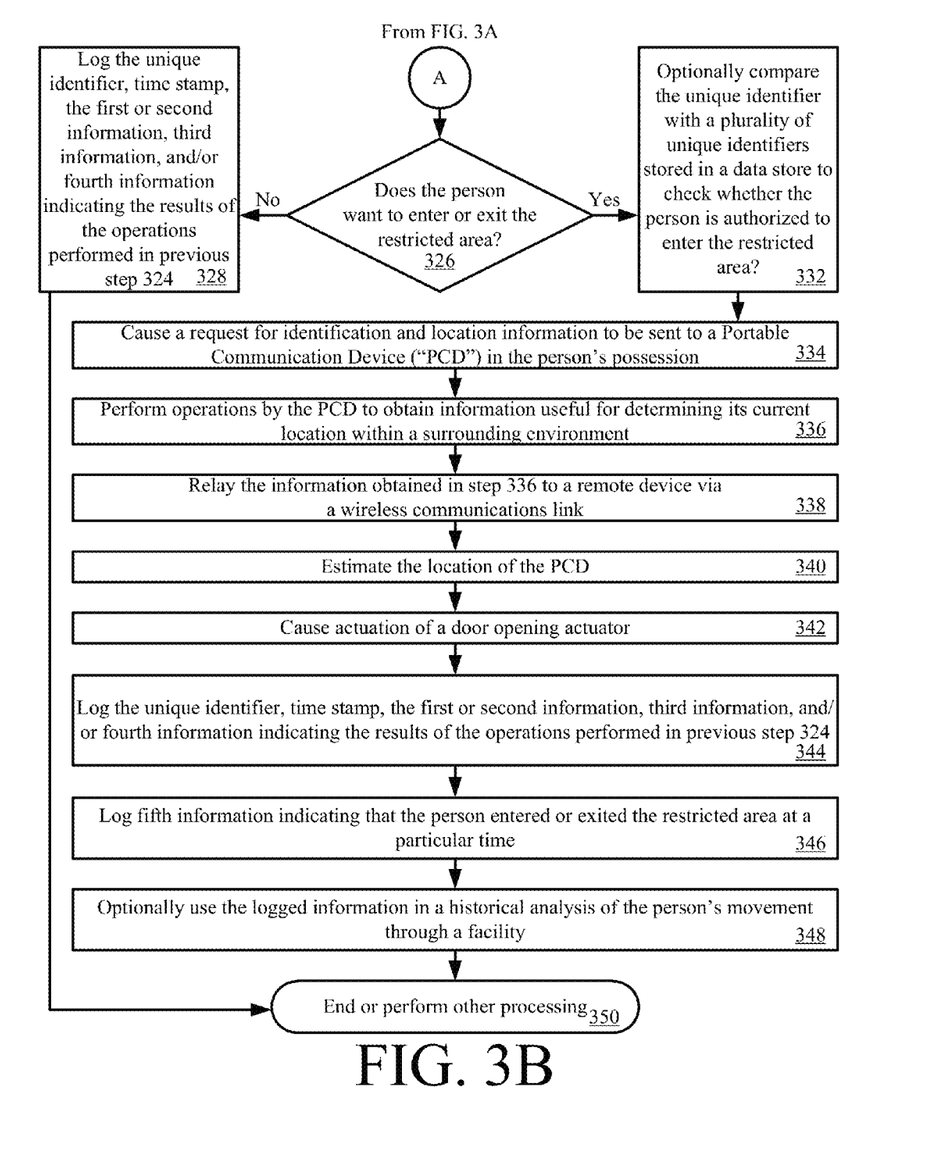

Referring now to FIGS. 3A-3B, there is provided a flow diagram of an exemplary method 300 for controlling access to a restricted area. As shown in FIG. 3A, method 300 begins with step 302 and continues with step 304 where an interrogation signal is transmitted from a reader (e.g., reader 104 of FIG. 1) of an ACS (e.g., ACS 100 of FIG. 1). In response to the interrogation signal, an SRC reply signal is transmitted from a WAS (e.g., WAS 114 of FIG. 1), as shown by step 306. The SRC reply signal comprises a unique identifier (e.g., unique identifier 210 of FIG. 2). In next step 308, the SRC reply signal is received at an antenna (e.g., antenna 106 or 108 of FIG. 1) coupled to the reader.

At the reader, actions are performed to obtain RSSI measurement data specifying the power present in the SRC reply signal over a given period of time, as shown by step 310. The RSSI measurement data is used by the reader to determine if the signal strength of the SRC reply message is increasing. Notably, this determination can alternatively be performed by a DPS (e.g., DPS 112 of FIG. 1). In this case, method 300 can be amended accordingly. Such changes are understood by persons skilled in the art.

If the signal strength of the SRC reply signal is decreasing [312:NO], then step 314 is performed where first information is generated indicating that the WAS is traveling away from the antenna. In contrast, if the signal strength of the SRC reply signal is increasing [312:YES], then step 316 is performed where second information is generated indicating that the WAS is traveling towards the antenna.

Upon completing step 314 or 316, the method 300 continues with step 318. Step 318 involves detecting the direction and/or speed/velocity of motion of the person (e.g., person 116 of FIG. 1) wearing the WAS. One or more motion sensors (e.g., sensors 120 and/or 122 of FIG. 1) can be used in step 318 for said detection. Thereafter in step 320, third information is communicated to the reader specifying the detected direction and/or speed/velocity of the person's motion. The reader then communicates the following information to the DPS: the unique identifier; a time stamp; the first information; the second information; and/or the third information, as shown by step 322.

At the DPS, operations are performed to determine whether or not the person is attempting to enter or exit the restricted area using the information received in previous step 322. For example, if the received information indicates that the WAS is traveling towards an entrance antenna (e.g., antenna 108 of FIG. 1) and the person is moving in a first direction (e.g., direction 124 of FIG. 1), then a determination is made that the person desires to enter the restricted area via an access point (e.g., access point 102 of FIG. 1). In contrast, if the received information indicates that the WAS is traveling towards an exit antenna (e.g., antenna 106 of FIG. 1) and the person is moving in a direction opposite the first direction (e.g., direction 126 of FIG. 1), then a determination is made that the person desires to exit the restricted area via the access point. If the received information indicates that the WAS is traveling away from the entrance antenna, then a determination is made that the person is not trying to enter the restricted area. Similarly, if the received information indicates that the WAS is traveling away from the exit antenna, then a determination is made that the person is not trying to exit the restricted area. The present invention is not limited to the particulars of these examples. In this regard, it should be understood that the DPS additionally or alternatively analyzes patterns of motion defined by the received information to determine whether or not the person desires to enter or exit the access point.

After completing step 324, method 300 continues with decision step 326 of FIG. 3B. If it is determined that the person does not want to enter or exit the restricted area [326:NO], then step 328 is performed where the following information is logged in a data store: the unique identifier;

a time stamp; the first or second information; the third information; and/or the fourth information indicating the results of the operations performed in previous step 324. Subsequently, step 350 is performed where method 300 ends or other processing is performed.

If it is determined that the person does want to enter or exit the restricted area [326:YES], then optional step 332 is performed. Optional step 332 is performed when the person is attempting to enter the restricted area, and therefore involves comparing the unique identifier with a plurality of unique identifiers stored in a data store to check whether the person is authorized to enter the restricted area. When a person is attempting to exit the restricted area or an authorized person is attempting to enter the restricted area, the DPS performs various actions as shown by steps 334-340. Steps 334-340 involve: causing a request for identification and location information to be sent to a PCD (e.g., PCD 150 of FIG. 1) in the person's possession; performing operations by the PCD to obtain information useful for determining its current location within a surrounding environment; relaying the information obtained in step 336 to a remote device via a wireless communications link; and estimating the location of the PCD.

Upon completing step 340, step 342 is performed where the DPS performs operation to cause actuation of a door opening actuator (e.g., door opening actuation 128 of FIG. 1). Upon completing step 342, steps 344-346 are performed to log the following information: the unique identifier; the time stamp; the first or second information; the third information; the fourth information; and/or fifth information indicating that the person entered or exited the restricted area at a particular time. The logged information can optionally be used in step 348 to perform a historical analysis of the person's movement through a facility. Thereafter, step 350 is performed where method 300 ends or other processing is performed.

Figure 4A:
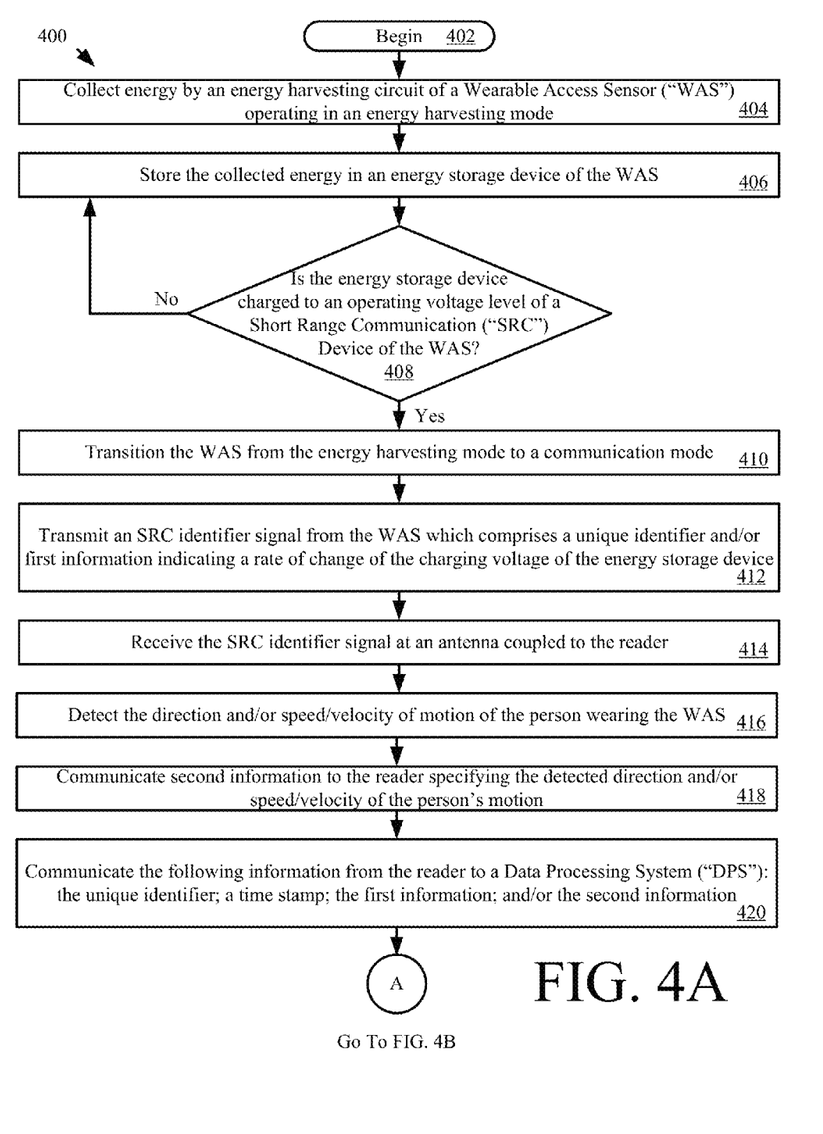
FIGS. 4A-4B collectively provide a flow diagram of another exemplary method for controlling access to a restricted area.
Figure 4B:
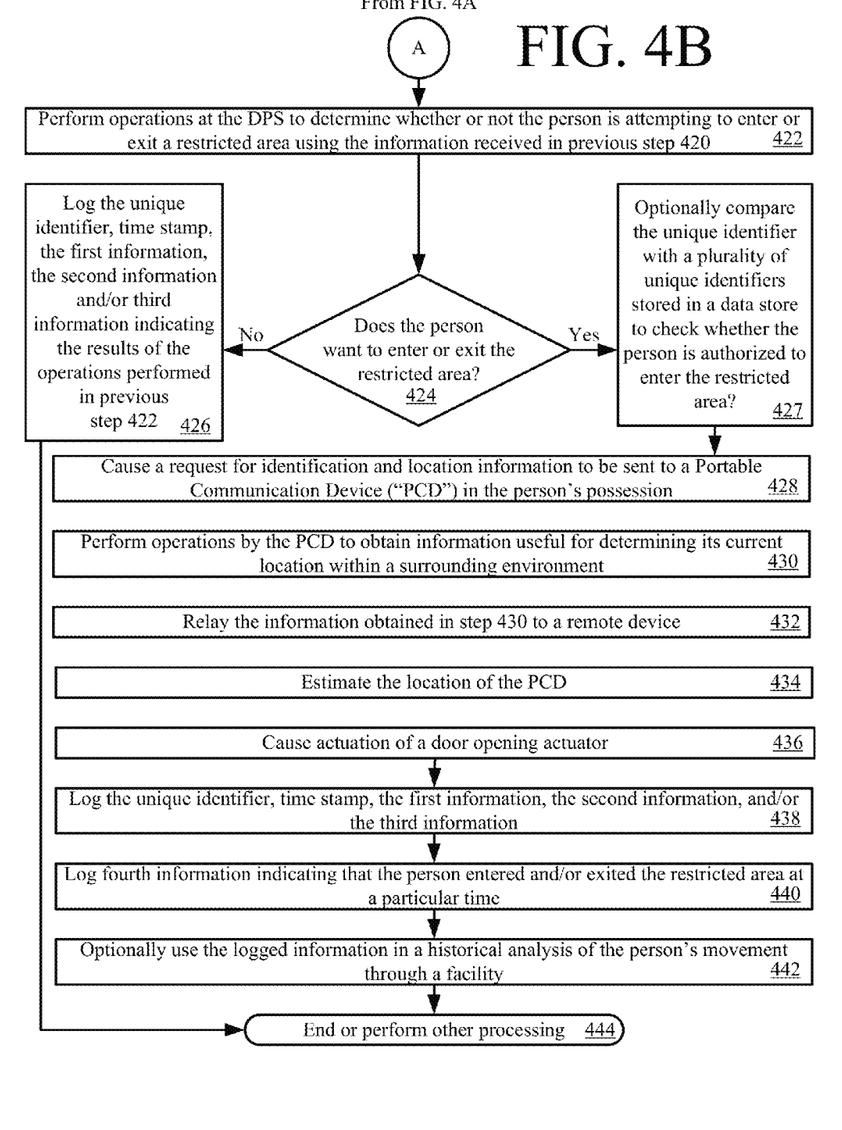

Referring now to FIGS. 4A-4B, there is provided a flow diagram of another exemplary method 400 for controlling access to a restricted area. As shown in FIG. 4A, method 400 begins with step 402 and continues with step 404 where an energy harvesting circuit (e.g., circuit 220 of FIG. 2) of a WAS (e.g., WAS 114 of FIG. 1) collects energy. The collected energy is then stored in an energy storage device (e.g., device 222 of FIG. 2) of the WAS as shown by step 406.

When the energy storage device charges to an operating voltage level of an SRC device (e.g., SRC device 212 of FIG. 2) of the WAS [408:YES], step 410 is performed where the WAS is transitioned from its energy harvesting mode to its communication mode. In its communication mode, step 412 is performed. Step 412 involves transmitting an SRC identifier signal from the WAS. The SRC identifier signal comprises a unique identifier and/or first information indicating a rate of change of the charging voltage of the energy storage device. The SRC identifier signal is then received in step 414 at an antenna (e.g., antenna 106 or 108 of FIG. 1) coupled to the reader.

In a next step 416, the direction and/or speed/velocity of motion of the person wearing the WAS is detected. One or more motion sensors (e.g., sensors 120 and/or 122 of FIG. 1) can be used in step 416 for said detection. Thereafter in step 418, second information is communicated to the reader specifying the detected direction and/or speed/velocity of the person's motion. The reader then communicates the following information to the DPS: the unique identifier; a time stamp; the first information; and/or the second information, as shown by step 420. After completing step 420, method 400 continues with step 422 of FIG. 4B.

At the DPS, operations are performed in step 422 to determine whether or not the person is attempting to enter or exit the restricted area using the information received in previous step 420. For example, if the received information indicates that the WAS is traveling towards an entrance antenna (e.g., antenna 108 of FIG. 1) and the person is moving in a first direction (e.g., direction 124 of FIG. 1), then a determination is made that the person desires to enter the restricted area via an access point (e.g., access point 102 of FIG. 1). In contrast, if the received information indicates that the WAS is traveling towards an exit antenna (e.g., antenna 106 of FIG. 1) and the person is moving in a direction opposite the first direction (e.g., direction 126 of FIG. 1), then a determination is made that the person desires to exit the restricted area via the access point. If the received information indicates that the WAS is traveling away from the entrance antenna, then a determination is made that the person is not trying to enter the restricted area. Similarly, if the received information indicates that the WAS is traveling away from the exit antenna, then a determination is made that the person is not trying to exit the restricted area. The present invention is not limited to the particulars of these examples. In this regard, it should be understood that the DPS additionally or alternatively analyzes patterns of motion defined by the received information to determine whether or not the person desires to enter or exit the access point.

After completing step 422, method 400 continues with decision step 424 of FIG. 4B. If it is determined that the person does not want to enter or exit the restricted area [424:NO], then step 426 is performed where the following information is logged in a data store: the unique identifier; a time stamp; the first information; the second information; and/or the third information indicating the results of the operations performed in previous step 422. Subsequently, step 444 is performed where method 400 ends or other processing is performed.

If it is determined that the person does want to enter or exit the restricted area [424:YES], then optional step 427 is performed. Optional step 427 is performed when the person is attempting to enter the restricted area, and therefore involves comparing the unique identifier with a plurality of unique identifiers stored in a data store to check whether the person is authorized to enter the restricted area. When a person is attempting to exit the restricted area or an authorized person is attempting to enter the restricted area, steps 428-434 are performed. These steps involve: causing a request for identification and location information to be sent to a PCD in a person's possession; performing operations by the PCD to obtain information useful for determining its current location within a surrounding environment; relaying the information obtained in step 430 to a remote device; and estimating a location of the PCD.

Upon completing step 434, step 436 is performed. In step 436, the DPS performs actions to cause actuation of a door opening actuator (e.g., door opening actuation 128 of FIG. 1). Next, steps 438-440 are performed to log the following information: the unique identifier; the time stamp; the first information; the second information; the third information; and/or the fourth information indicating that the person entered or exited the restricted area at a particular time. The logged information can optionally be used in step 442 to perform a historical analysis of the person's movement through a facility. Thereafter, step 444 is performed where method 400 ends or other processing is performed.

Additionally, in some scenarios, the WAS may detect no rate of change when the wearer is standing near the access point of a restricted area. For example, let's assume that a person travels towards the access point whereby the WAS detects a rate of change of the energy collected by the energy harvesting circuit thereof. When the person arrives at the access point, (s)he is stopped by another person for a discussion. At this time, the WAS detects no rate of change of the energy collected by the energy harvesting circuit thereof. In response to such a detection, the WAS communicates a signal to the reader (e.g., reader 104 of FIG. 1) indicating that there is currently no change in the rate at which the energy harvesting circuit is collecting energy. In turn, the reader performs operations to cause termination of the emission of an electromagnetic field from the entrance antenna (e.g., antenna 108 of FIG. 1). The electromagnetic field is once again emitted upon the expiration of a pre-defined period of time (e.g., 2 minutes). In this way, the person may still obtain access to the restricted area after finishing said discussion with the other person.

Figure 5:
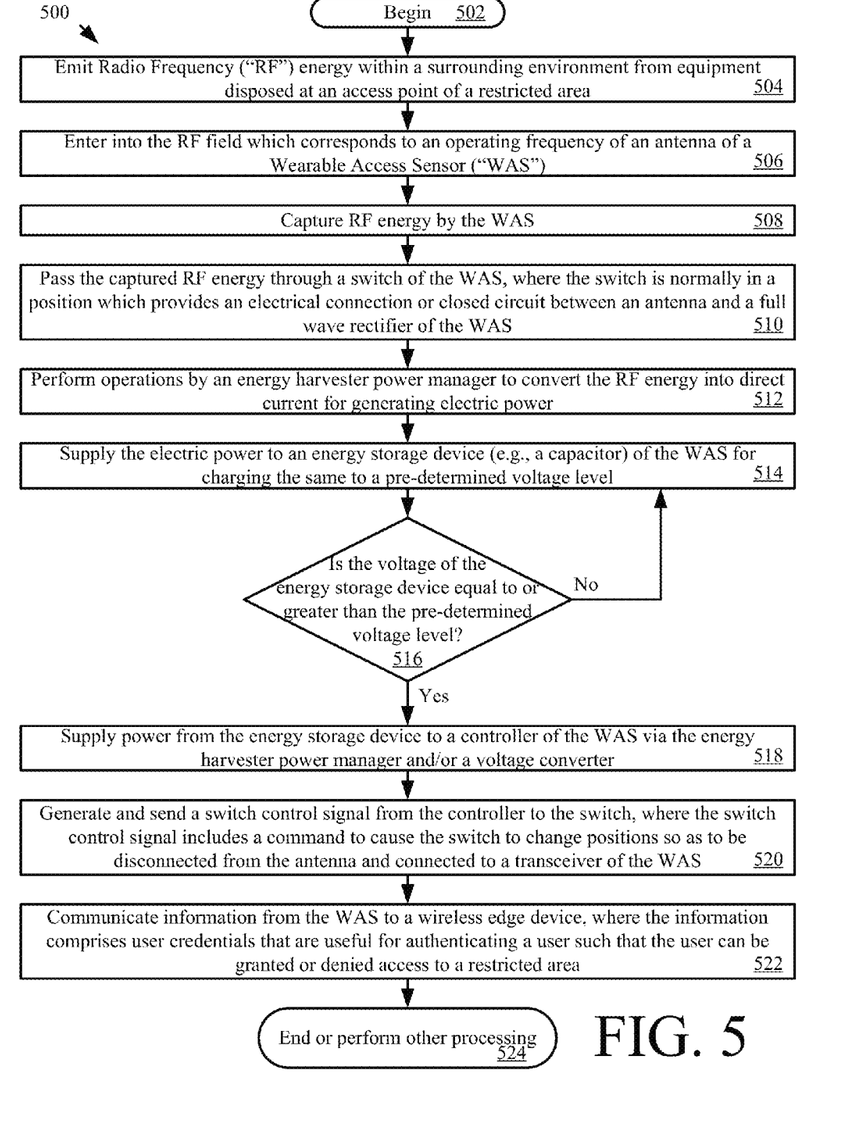
FIG. 5 provides a flow diagram of an exemplary method for operating a WAS.

Referring now to FIG. 5, there is provided a flow diagram of an exemplary method 500 for operating a WAS (e.g., WAS 114 of FIG. 1). Method 500 begins with step 502 and continues with step 504 where RF energy is emitted within a surrounding environment from equipment disposed at an access point of a restricted area. Next in step 506, a person (e.g., person 116 of FIG. 1) wearing the WAS enters into the RF field at an operating frequency of an antenna of the WAS. As a result, RF energy is captured by the WAS as shown by step 508. The captured RF energy is passed through a switch of the WAS, as shown by step 510. The switch is normally in a position which provides an electrical connection or closed circuit between an antenna (e.g., antenna 202 of FIG. 2) and a full wave rectifier (e.g., full wave rectifier 252 of FIG. 2) of the WAS. An energy harvester power manager (e.g., energy harvester power manager 258 of FIG. 2) then performs operations in step 512 to convert the RF energy into direct current for generating electric power. The electric power is supplied to an energy storage device (e.g., energy storage device 262 of FIG. 2) of the WAS in step 514 for charging the same to a pre-determined voltage level. If the voltage of the energy storage device (e.g., a capacitor) is not equal to or greater than the pre-determined voltage level [516:NO], then method 500 returns to step 514 so that the energy storage device continues to be charged.

If the voltage of the energy storage device (e.g., a capacitor) is equal to or greater than the pre-determined voltage level [516:YES], then steps 518-522 are performed. These steps involve: supplying power from the energy storage device to a controller (e.g., controller 206 of FIG. 2) of the WAS via the energy harvester power manager and/or a voltage converter; generating and sending a switch control signal from the controller to the switch so as to cause the switch to change positions so as to be disconnected from the antenna and connected to a transceiver of the WAS; and communicating information from the WAS to a wireless edge device. In some scenarios, the information comprises user credentials that are useful for authenticating a user such that the user can be granted or denied access to a restricted area. Upon completing step 522, step 524 is performed where method 500 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for operating a Wearable Access Sensor ("WAS"), comprising:
   capturing RF energy by the WAS being worn by a person, where the RF energy is emitted within a surrounding environment from equipment disposed at an access point of a restricted area;
   passing the RF energy through a switch that is normally in a position which provides an electrical connection between an antenna of the WAS and a full wave rectifier of the WAS;
   performing operations by the WAS to convert the RF energy into direct current for generating electric power;
   supplying the electric power to an energy storage device of the WAS for charging the energy storage device to a pre-determined voltage level; and
   supplying power from the energy storage device to a controller of the WAS when a voltage level of the energy storage device is equal to or greater than the pre-determined voltage level.

2. The method according to claim 1, wherein the energy storage device comprises a super capacitor.

3. The method according to claim 1, further comprising generating and sending a switch control signal from the controller to the switch to cause the switch to change positions such that the switch is disconnected from the antenna and connected to a transceiver of the WAS.

4. The method according to claim 3, further comprising communicating information from the WAS to a wireless edge device.

5. The method according to claim 4, wherein the information comprises user credentials that are useful for authenticating a user such that the user can be granted or denied access to the restricted area.

6. The method according to claim 1, wherein the power is supplied from the energy storage device to the controller via a voltage converter that changes the pre-determined voltage level to a sub-threshold voltage level.

7. The method according to claim 1, further comprising increasing or decreasing, by a voltage converter of the WAS, a voltage level of a signal received from the energy storage device to a sub-threshold voltage level that is at least one order of magnitude below a normal operating range for the WAS, prior to supplying the power from the energy storage device to the controller.

8. The method according to claim 7, wherein the normal operating range of a voltage level is 1.2 Volts to 3.6 Volts.

9. The method according to claim 7, wherein the sub-threshold voltage level is within 200 milli-Volts to 600 milli-Volts.

10. The method according to claim 1, wherein a directionality of the WAS's movement is determined based on at least one of a rate of change of a charging voltage of the energy storage device and a detected direction of travel of the WAS in relation to the access point.

11. A Wearable Access Sensor ("WAS"), comprising:
an article wearable on a person;
an electronic circuit coupled to the article and comprising:
  an antenna configured to capture RF energy emitted within a surrounding environment from equipment disposed at an access point of a restricted area;
  a switch through which the RF energy passes, where the switch is normally in a position which provides an electrical connection between the antenna and a full wave rectifier;
  said full wave rectifier configured to convert the RF energy into direct current for generating electric power and to supply the electric power to charge an energy storage device; and
  an energy harvester power manager configured to supply power from the energy storage device to a controller when a voltage level of the energy storage device is equal to or greater than a pre-determined voltage level.

12. The WAS according to claim 11, wherein the energy storage device comprises a super capacitor.

13. The method according to claim 11, wherein the controller is configured to generate and send a switch control signal to the switch to cause the switch to change positions such that the switch is disconnected from the antenna and connected to a transceiver of the WAS.

14. The method according to claim 13, wherein the transceiver is configured to communicate information from the WAS to a wireless edge device.

15. The method according to claim 14, wherein the information comprises user credentials that are useful for authenticating a user such that the user can be granted or denied access to the restricted area.

16. The method according to claim 11, wherein the power is supplied from the energy storage device to the controller via a voltage converter that changes the pre-determined voltage level to a sub-threshold voltage level.

17. The method according to claim 11, wherein the voltage level of a signal received from the energy storage device is increased or decreased to a sub-threshold voltage level that is at least one order of magnitude below a normal operating range for the WAS, prior to when the power is supplied from the energy storage device to the controller.

18. The method according to claim 17, wherein the normal operating range of a voltage level is 1.2 Volts to 3.6 Volts.

19. The method according to claim 17, wherein the sub-threshold voltage level is within 200 milli-Volts to 600 milli-Volts.

20. The method according to claim 11, wherein a directionality of the WAS's movement is determined based on at least one of a rate of change of a charging voltage of the energy storage device and a detected direction of travel of the WAS in relation to the access point.

* * * * *